United States Patent
Levrai et al.

[11] Patent Number: 5,878,577
[45] Date of Patent: Mar. 9, 1999

[54] PNEUMATIC BRAKE SERVO WITH AN IMPROVED VALVE

[75] Inventors: Roland Levrai, Stains; Christian Tanguy, Frepillon, both of France

[73] Assignee: Bosch Systems De Freinage, Drancy, France

[21] Appl. No.: 737,030

[22] PCT Filed: Oct. 15, 1996

[86] PCT No.: PCT/FR96/01604

§ 371 Date: Oct. 30, 1996

§ 102(e) Date: Oct. 30, 1996

[87] PCT Pub. No.: WO97/28033

PCT Pub. Date: Aug. 7, 1997

[30] Foreign Application Priority Data

Jan. 30, 1996 [FR] France .................................. 9601043

[51] Int. Cl.$^6$ .............................................. F15B 9/10
[52] U.S. Cl. ................................................ 60/579; 91/378
[58] Field of Search .............................. 60/579; 91/368, 91/376 R, 378

[56] References Cited

U.S. PATENT DOCUMENTS

| | | | |
|---|---|---|---|
| 1,797,853 | 3/1931 | Brigg et al. ............................ | 91/378 |
| 3,209,654 | 10/1965 | Randol ................................... | 91/378 |
| 4,961,318 | 10/1990 | Carre .................................... | 60/579 |

Primary Examiner—F. Daniel Lopez
Attorney, Agent, or Firm—Leo H. McCormick, Jr.; Warren Comstock

[57] ABSTRACT

The brake booster has an envelope (10) with an axis of symmetry (X–X') separated sealingly by at least one movable partition (12) to define at least a first chamber (14) connected permanently to a source of low pressure and at least a second chamber (16). The second chamber (16) being selectively connected to the first chamber (14) or a source of high pressure through a three way valve structure actuated by a control rod (30,130). The three way valve structure has a plunger (28,128) which slides in a bore (26,126) of a piston (20,90) is connected to a control rod (30,130). The position of the plunger (28,128) in bore (26,126) selectively controls the communication between the first chamber (14) and the second chamber (16) or communication between the second chamber (16) and the source of high pressure. Piston (20,90) includes support structure (38,138) having first (46,48) and second (146,148) seals which co-operate with a cylindrical surface (34,134) on the plunger (28,128) and a median part (40,140) for guiding the sliding of the plunger (28,128) in bore (26,126).

8 Claims, 4 Drawing Sheets

PNEUMATIC BRAKE SERVO WITH AN IMPROVED VALVE

The present invention relates to pneumatic boosters, or servo actuators, of the kind which are used to provide braking assistance for automobile vehicles.

BACKGROUND OF THE INVENTION

Such boosters are well known in automobile technology and comprise in general an envelope within which is disposed a piston formed from a hub and a skirt. The piston defines a front chamber connected permanently to a source of low pressure and a rear chamber connected selectively to the front chamber or to a source of high pressure by a valve means. This valve means is actuated by a control rod which is capable of bearing, through the intermediary of the front face of a plunger, on the rear face of a reaction disc which is solid with a thrust rod, the thrust rod actuating a master cylinder. The valve means usually comprises a valve member whose annular front face co-operates with a first circular valve seat formed on the plunger and a second circular valve seat formed on the piston and of diameter greater than that of the first valve seat. A valve spring urges the annular front face towards the valve seats so that the front face is always in contact with at least one of these two seats.

Such boosters present several disadvantages. Thus, in order to ensure that communication between the front and rear chambers of the booster is closed off before opening communication between the rear chamber and the source of high pressure, it is necessary to manufacture the plunger and the piston hub with very tight tolerances to avoid the control rod having too long a dead stroke, or even to design the valve means in such a way that the "valve lift" between the valve and the first valve seat will be as small as possible.

An additional disadvantage of the known boosters resides in the fact that the only radial passage opened to the high pressure air towards the rear chamber during actuation as well as the only axial passage opened to the air from the rear chamber towards the front chamber during release of breaking, produce turbulence in the moving air, slowing the action of the booster and inducing operational noises which can become troublesome.

Another disadvantage follows from the concentric and substantially coplanar disposition of the two valve seats, which means that the flexible membrane of the valve member is subjected to a variable pressure differential between the high pressure which is substantially constant prevailing permanently within the tubular hub around the input rod, and the variable pressure prevailing in the annular chamber surrounding this part of the flexible membrane of the valve member, on one part of which is exerted the pressure prevailing in the front chamber of the booster and on another part of which is exerted the variable pressure prevailing in the rear chamber of the booster.

This pressure differential, which exists in the rest condition and in the phase of brake release, applies an axial force to the annular front face of the valve member which adds to the valve spring force and which the plunger of the valve must overcome during each phase of brake release to disengage the annular front face of the valve member from the first valve seat formed in the hub and re-establish the communication between the rear working chamber of the booster and the vacuum chamber, which requires the return spring of the input rod to be oversize and in particular results in the driver having to apply a high force to bring the booster into operation, this force being known in the art under the term of "step-in force".

In addition, as the valve member is formed of a flexible diaphragm fixed sealingly by its outer peripheral edge to the piston by means of a metallic cup which also serves as load bearer for the valve spring and for a return spring of the control rod, the assembly of the three way valve means in the piston hub is a delicate and complex operation, with a rejection rate which is not negligible and which causes a significant increase in the cost of the booster.

The document DE-A-3 445 118 attempts to offer a solution to these problems, by making the plunger in a design similar to the spool of a slide valve. The plunger is capable of sliding within a bore in the hub of the piston to close off or open two windows formed in the hub communicating with the rear chamber of the booster. Such a design still requires a very precise match between the bore of the hub in the piston and the plunger sliding in the hub. It also requires the presence of a seal member at the edges of one of the windows formed in the hub of the piston and of a seal member at the end of the plunger. These seals cooperate either with a rib on the plunger, or with the edge of one of the windows, and they are therefore liable to deteriorate very rapidly, which is harmful for the reliability of the booster they are fitted in. In addition, this document still only provides a single axial passage between the front and rear chambers, and a single radial passage between the high pressure source and the rear chamber, resulting once again in turbulence which generates operating noise and in reduced speed of operation of the booster

SUMMARY OF THE INVENTION

The present invention is situated in this context and has as object to provide a booster in which the air flow passages between the atmosphere and the rear chamber on one hand and between the rear chamber and the front chamber on the other hand, will have as large a cross sectional area as possible without presenting any obstacles which could generate turbulence, so as to obtain silent operation and as short a response time as possible, simply, reliably and cheaply.

To this end, the present invention provides a pneumatic booster for braking assistance, comprising an envelope presenting an axis of symmetry, separated sealingly by at least one movable partition structure into at least one front chamber connected permanently to a source of low pressure, and at least one rear chamber connected selectively to the front chamber or to a source of high pressure through a three way valve means comprising a plunger sliding in a bore of a piston and solid with a control rod, the position of the plunger in the bore determining communication between the front chamber and the rear chamber or communication between the rear chamber and the source of high pressure.

In accordance with the present invention, a support structure is disposed in the piston, this support structure comprising two annular seals cooperating with a cylindrical surface of the plunger and a median part for guiding sliding of the plunger Advantageously, the annular seals are each formed with an angled edge whose vertex in the rest condition is disposed at a distance from the axis of symmetry which is slightly less than the radius of the cylindrical surface of the plunger.

In equally advantageous fashion, the angled edges of the seals are disposed in parallel planes which are spaced apart axially by a distance which is slightly less than the axial length of the cylindrical surface of the plunger.

In accordance with features which are also advantageous, the cylindrical surface of the plunger leads at its front and at its rear into truncated conical surfaces.

Preferably, the openings are formed in the median part of the support structure and communicate with radial passages formed in the piston and which communicate with the rear chamber of the booster. The piston may then comprise axial passages which open into the bore in which the plunger slides and communicate with the front chamber of the booster, the axial passages being aligned with the radial passages communicating with the rear chamber of the booster.

In accordance with one embodiment, the three way valve is disposed in a tubular rear part of the piston solid with the movable partition structure of the booster.

In accordance with another embodiment, the three way valve is disposed in a piston of a control module which controls the booster remotely. Such a control module may advantageously comprise a stepped piston dividing a bore into a first volume connected permanently to the rear chamber of the booster through a duct and a second volume connected permanently to the front chamber of the booster through a duct, and an annular assistance chamber connected through a duct to the output of a pressure generator actuated by the booster.

Other objects, features and advantages of the present invention will appear more clearly from the following description of an embodiment thereof, given by way of illustration, with reference to the accompanying drawings.

DETAILED DESCRIPTION OF THE INVENTION

Figure 1:
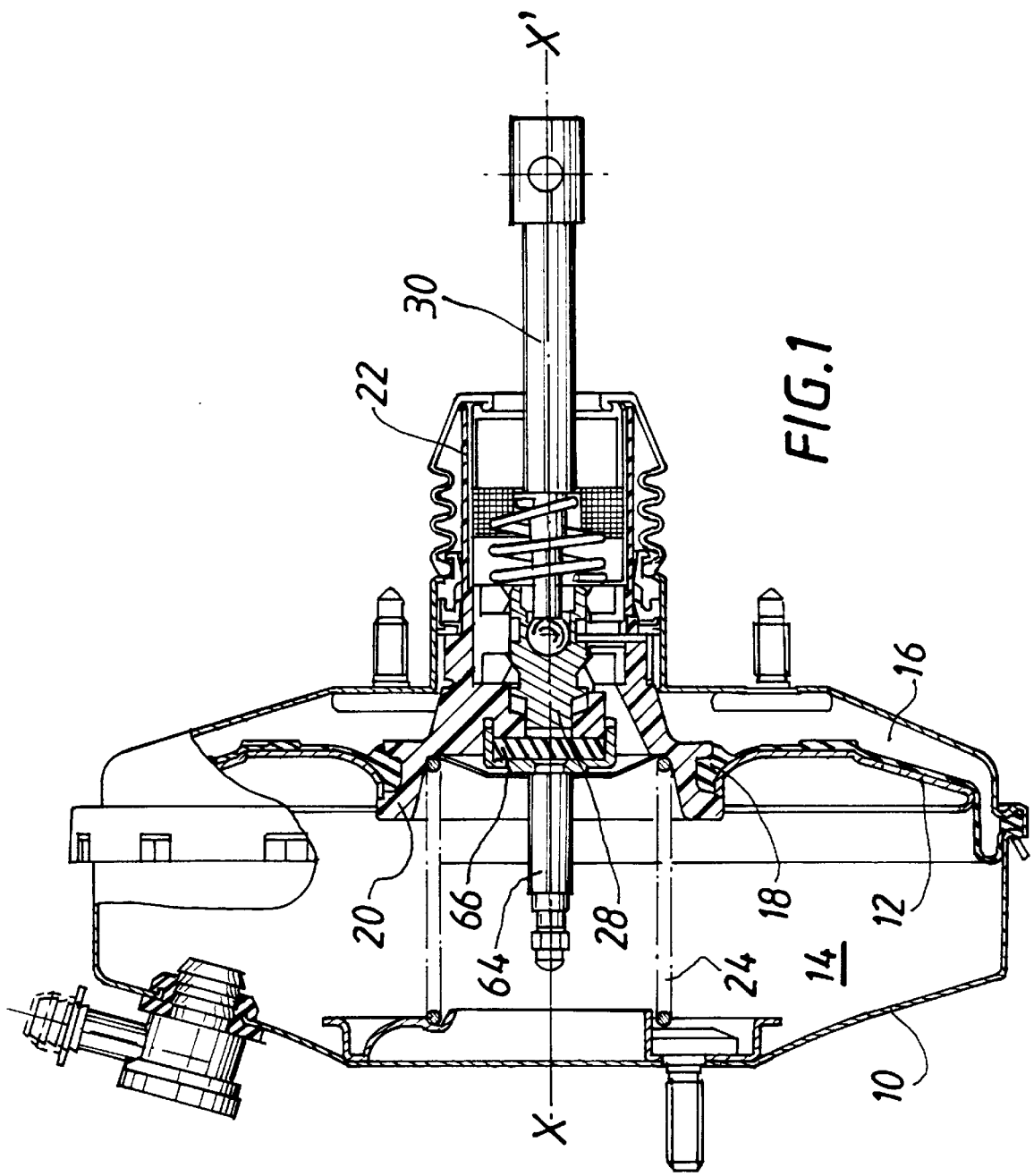
FIG. 1 shows an elevational view in longitudinal section of a pneumatic booster for braking assistance, provided with a valve member made in accordance with the present invention.

FIG. 1 shows a sectional view of a pneumatic booster for braking assistance designed to be placed in the conventional manner between the brake pedal of a vehicle and the master cylinder which controls the pressure in the hydraulic braking circuit of this vehicle.

The convention is to call the "front" of the booster that part of it which is facing the master cylinder and the "rear" of the booster that part which is facing the brake pedal. In the drawings, the front is accordingly to the left and the rear to the right.

Figure 2:
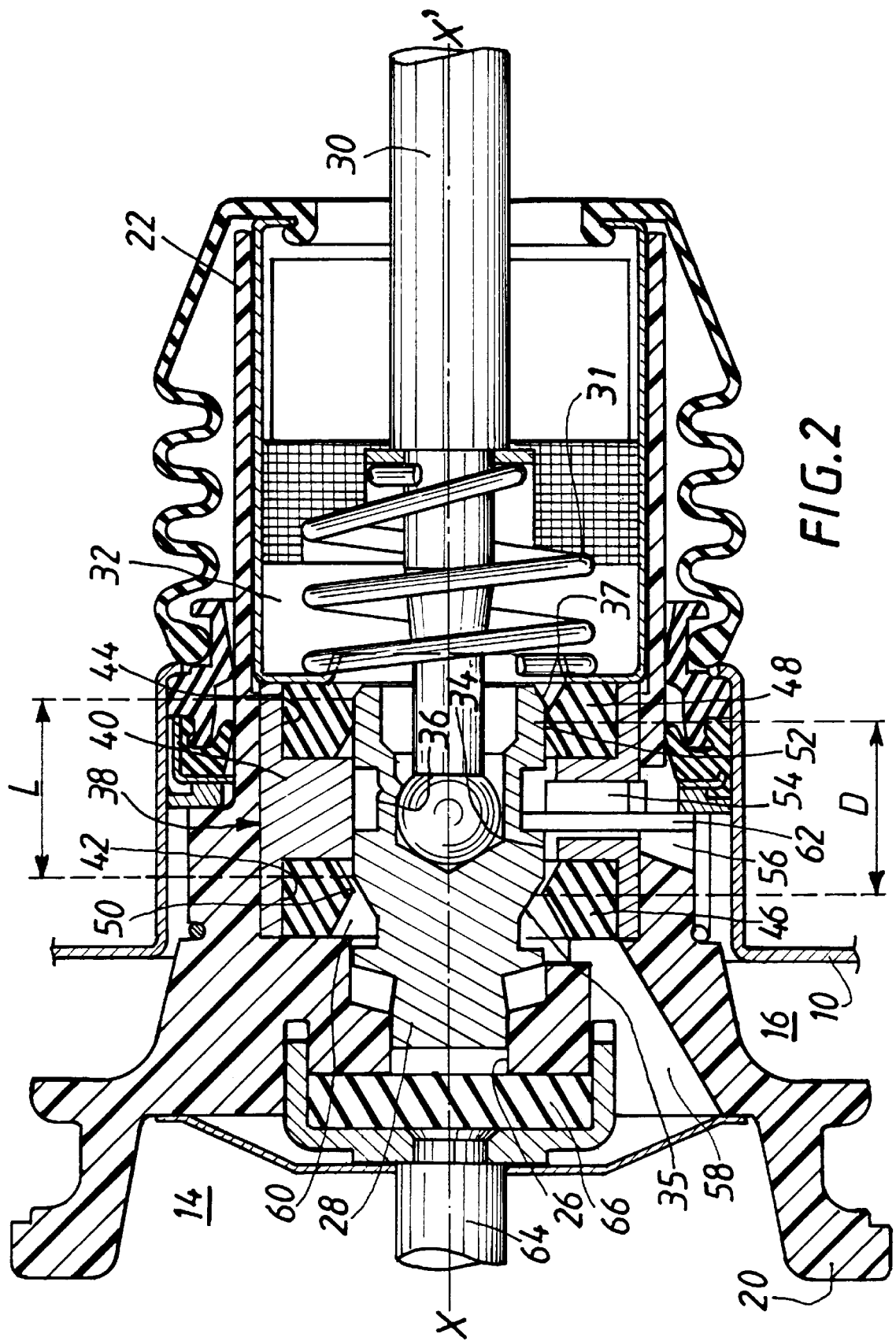
FIG. 2 shows a view to a larger scale of the rear central part of the booster of FIG. 1.

The booster shown in FIGS. 1 and 2 comprises an outer envelope 10 in the form a shell, having rotational symmetry about an axis X–X'. Only the rear central part of this envelope 10 is shown in FIG. 2.

A movable partition structure 12 defines within the envelope 10 a front chamber 14, permanently connected to a source of vacuum through a duct 15, and a rear chamber 16. The movable partition 12 is associated with a flexible rolling diaphragm of elastomer whose inner peripheral edge is received sealingly by means of a bead 18 in a hollow booster piston 20, which is solid with the structure of the movable partition 12, and is disposed along the axis X–X' of the booster, the outer peripheral edge of the flexible a diaphragm being fixed sealingly to the outer envelope 10.

The hollow piston 20 extends rearwards in the form of a tubular part 22 which passes sealingly through the rear wall of the envelope 10. A compression spring 24 interposed between the piston 20 and the front wall of the envelope 10 normally maintains the piston 20 in the rearward rest position illustrated in FIGS. 1 and 2 in which the rear chamber 16 is at its minimum volume and the front chamber 14 at its maximum volume.

A plunger 28, which is symmetrical relative to the axis X–X', is received slidingly at its front end in a bore 26, which may be stepped, formed in the central part of the piston 20. The front end of a control rod 30 of the booster also disposed along the axis X–X' is mounted pivotingly in a blind hole in the plunger 28. The rear end of the control rod 30 is controlled directly by the brake pedal of the vehicle (not shown), and is urged back towards to its rest position by a return spring 31 engaging within the tubular part 22.

In the usual way, when the driver of the vehicle presses on the brake pedal, the control rod 30 actuates a three way valve means to bring the annular space 32 around the control rod 30 into communication with the rear chamber 16 and hence to create a pressure differential from one side to the other of the movable partition 12, resulting in a boost force which is proportional to the force exerted on the brake pedal.

In accordance with the present invention, the three way valve means is formed by the plunger 28 itself.

More precisely, as shown in FIG. 2, the plunger 28 is shaped with a cylindrical outer surface 34 in which a peripheral groove 36 defines two radial shoulders. The surface 34 leads at the front into a truncated conical surface 35 and at the rear into a truncated conical surface 37.

A support structure 38 is arranged fixedly in the tubular part 22 and comprises a median part 40 between two annular recesses 42 and 44 for annular seals 46 and 48 respectively. The inner diameter of the median part 40 is slightly greater than the diameter of the cylindrical surface 34, so as to provide guidance for the plunger in its translation movements along the axis X–X'.

The annular seals 46 and 48 are identical and have a cross section of polygonal shape, whose outer part (relative to the axis X–X') is complementary that of the recesses 42 and 44. The inner part of the section of each seal is triangular, and forms a salient angled edge 50 and 52 respectively, whose vertex, in the rest position, is disposed at a distance from the axis X–X' which is slightly less than the radius of the cylindrical surface 34 of the plunger 28.

Moreover, the angled edges 50 and 52 are disposed in parallel planes spaced apart axially by a distance D, and the axial length L of the cylindrical surface 34 of the plunger 28 is slightly greater than the distance D.

In its median part 40, the support structure 38 comprises radial openings 54, spaced apart regularly around the access X–X', communicating with the radial passages 56 formed in the tubular part 22 of the piston 20 and opening into the rear chamber 16 of the booster.

The piston 20 is also formed with axial passages 58 which are regularly spaced apart around the axis X–X' and put the front chamber 14 of the booster into communication with the front part 60 of the internal volume of the bore 26 around the plunger 28, in front of the truncated conical surface 35.

Lastly, at least one abutment member 62 is mounted in the tubular part 22 of the piston 20 to limit the axial stroke of the plunger 28 relative to the piston 20 and define its rear rest position relative to the piston 20. The abutment member 62 passes through the openings 52 and the passages 54, for example, in order to form a stop for the rear face of the forward shoulder of the groove 36 of the plunger 28.

In the rest position, the various components of the booster occupy the relative positions shown in FIGS. 1 and 2. In this position, the plunger 28 bears against the rear of the abutment member 60 under the force applied by the spring 31. The angled edge 52 of the seal 48 bears against the surface 34 of the plunger, thus isolating the annular space 32 from the rest of the booster. The surface 34 is disengaged from the angled edge 50 of the seal 46 and therefore allows communication between the front chamber 14 and the rear chamber 16 through the intermediary of the passages 58, the volume 60, the openings 54 and the passages 56.

To obtain braking action, the driver of the vehicle presses on the brake pedal, which results in a movement forwards of the control rod 30 and of the plunger 28. The plunger slides initially in the bore 26 and within the guide surface formed by the median part 40 of the support structure 38.

During this movement, the surface 34 stays in contact with the angled edge 52, while the truncated conical surface 35 comes into contact with the angled edge 50, which it lifts slightly moving it away from the axis X–X' so that it comes into contact with the surface 34. The communication between the front and rear chambers 14 and 16 is then cut off by closure of the valve passage formed by the annular seal 46 cooperating with the surface 34 of the plunger.

The forward movement of the control rod 30 and of the plunger 28 continue, and the surface 34 stays in contact with the angled edge 50, while it will lose contact with the angled edge 52. The air at atmospheric pressure in the annular volume 32 can thus reach the rear chamber 16 through the openings 54 and the passages 56. The pressure can thus increase in the rear chamber 16 of the booster and create a pressure difference across the movable partition 12, resulting in an increased boost force to displace it forwards, this force being transmitted to a thrust rod 64 by an annular front face of the piston 20 acting on a reaction disc 66, against the central part of which bears the front face of the plunger 28.

Advantageously, due to the present invention, the openings 54 and the passages 56 can be designed in such a way that they extend over arcs of a circle which are relatively wide in angle, since the seals 46 and 48 as well as the support structure 38 are only subjected to relatively small forces, and therefore do not require a very high mechanical strength. It is therefore possible to benefit fully from the 360 degree opening of the valve passage formed by the annular seal 48 cooperating with the surface 34 of the plunger.

In addition, it will be seen that the two valve passages, between the atmosphere and the rear chamber on one hand, and between the rear chamber and the front chamber on the other hand, are disposed in different transverse planes, containing the angled edges 50 and 52, and are no longer coplanar as in the conventional designs of the prior art. It follows that the diameter of these valve passages are independent of each other, and are only limited by the maximum diameter of the tubular part 22 or by the minimum diameter of the plunger 28. These valve passages can therefore be given any diameter desired within these limits.

When the driver wishes to reduce the braking action or to terminate it, he reduces the force applied to the control rod 30. The control rod then retreats and brings with it in its movement the plunger 28. In this retreating movement, the surface 34 remains in contact with the angled edge 50, while the truncated conical surface 37 comes into contact with the angled edge 52, which it lifts slightly, moving it away from the axis X–X', so that it comes into contact with the surface 34. The communication between the rear chamber 16 and the atmosphere is then cut off, by the closure of the valve passage formed by the annular seal 48 cooperating with the surface 34 of the plunger.

The rearwards movement of the control rod 30 and of the plunger 28 continues, and the surface 34 will remain in contact with the angled edge 52, while it will lose contact with the angled edge 50. The air contained in the rear chamber can thus reach the front chamber 14, permanently connected to a source of vacuum, through the passages 56 and the openings 54. The pressure can thus reduce in the rear chamber 16 of the booster and will decrease the pressure difference across the movable partition 12, resulting in a decreased boost force, the movable partition 12 then moving rearwards under the effect of the spring 24.

The pressures (in fact partial vacuum) between the two chambers 14 and 16 rapidly equalise, this being obtained by enabling the plunger 28 to retreat by a stroke which is large relative to that of the piston 20. It will be seen again that the air is led to flow through the passages 58, whose angular size can be relatively large.

Moreover, as seen for the actuation phase, the diameter of the valve passage 34–50 is only limited by the maximum diameter of the tubular part 22 or by the minimum diameter of the plunger 28. It can therefore be given any desired value.

The invention also enables the operating noise of the booster to be reduced in considerable proportions. The particular design of the three way valve forming the valve according to the invention enables an equal number of openings or passages 54, 56 and 58 to be provided, spaced regularly around the axis X–X', in such a way that their centres are in the same plane, as shown in FIG. 2. Accordingly, the masses of air which are set in motion during the operation of the booster provided with the valve according to the present invention will have a velocity whose components will be contained in a single plane, for example that of the FIG. 2.

In other words, the flow of air in the booster is perfectly symmetrical around the axis X–X' in all the cases of operation, that is to say that all turbulence is eliminated, as well as the noises which result from it.

Figure 3:
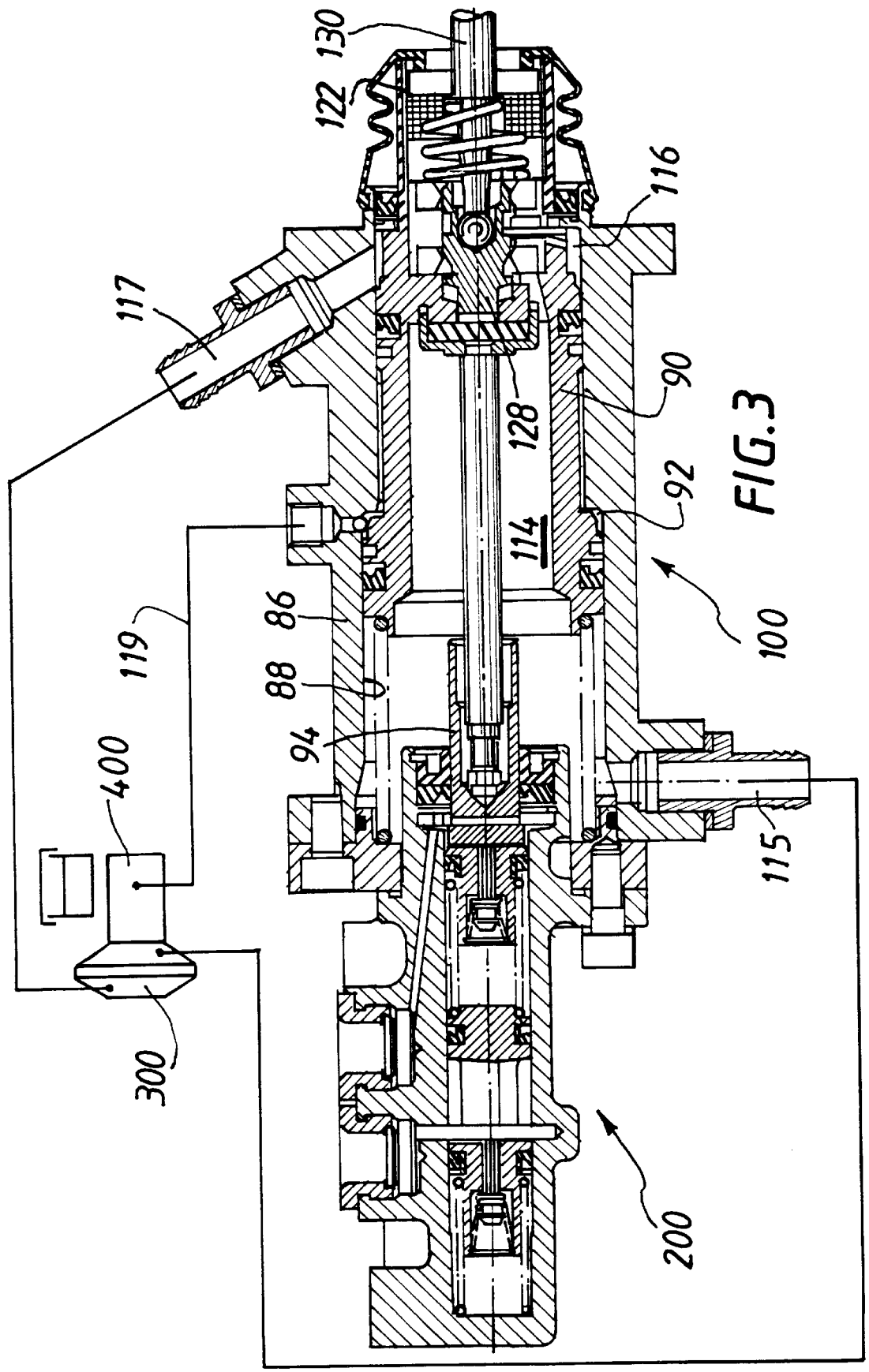
FIG. 3 shows an elevational view in longitudinal section of a control module of a pneumatic booster for braking assistance, this module being provided with a valve member made in accordance with the present invention.
Figure 4:
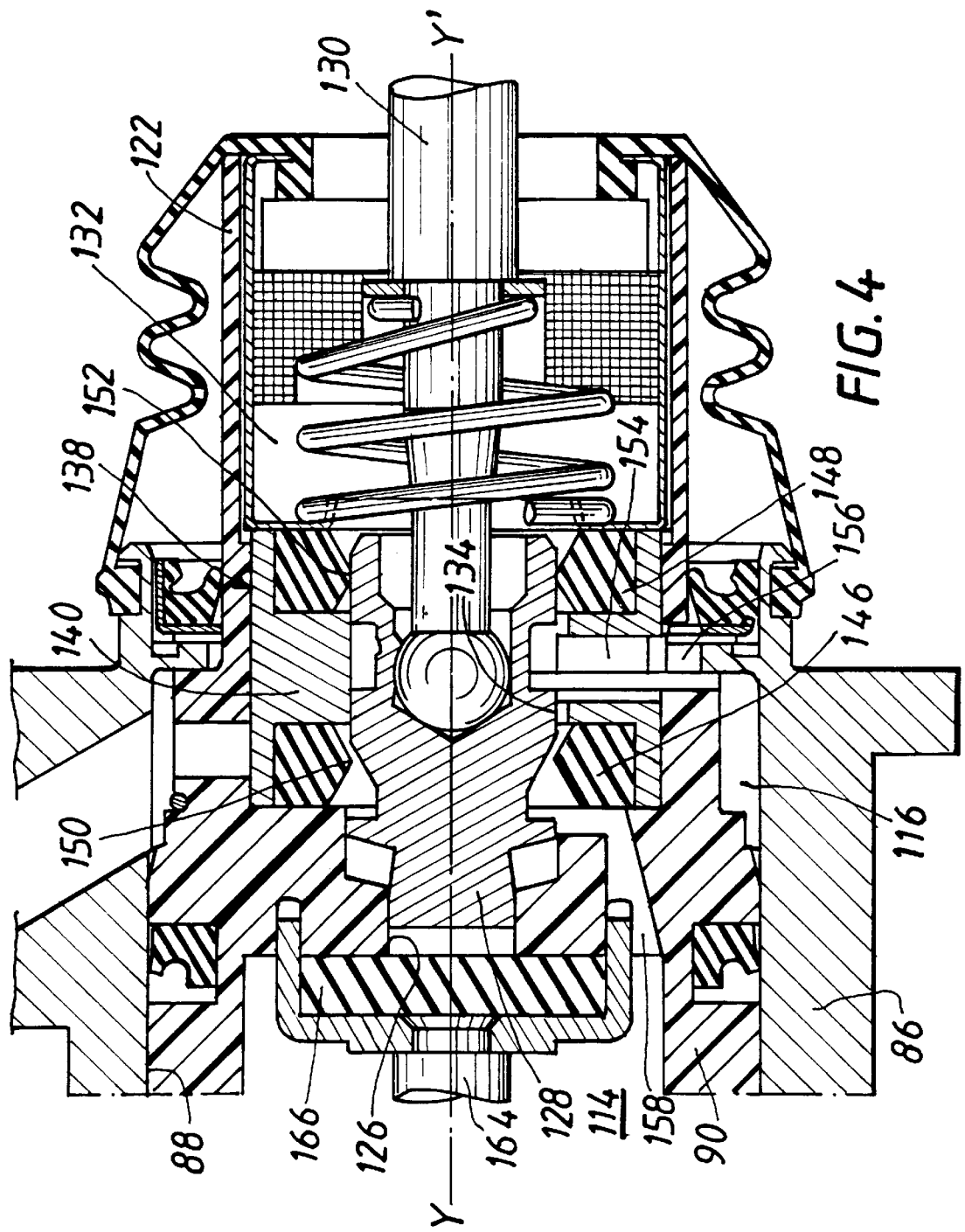
FIG. 4 shows a view to a larger scale of the rear central part of the control module of FIG. 3.

In FIGS. 3 and 4 is shown a second embodiment of the present invention, which is applicable to a control module 100 for a booster of the kind which is described for example in the document EP-A-O 326 965. In these drawings, elements corresponding to those of FIGS. 1 and 2 are given the same reference numbers, increased by one hundred.

The control module 100 is actuated by a control rod 130 connected to a brake pedal (not shown) disposed in the passenger compartment of the vehicle. The module 100 comprises a body 86 which is symmetrical in rotation about an axis Y–Y' and is formed with a stepped bore 88 within which slides sealingly a stepped piston 90. The piston 90 divides the bore 88 internally into a first volume 116 formed at the rear of the bore and a second volume 114 formed at the front, and connected permanently to a source of vacuum through a duct 115. The piston 90 is extended rearwards by a rear tubular part 122 which slides sealingly within the body 86, and it is formed with a bore 126, which may be stepped, within which slides a plunger 128.

The first volume 116 is brought selectively into communication with the second volume 114 or with the annular space 132 around the control rod 130, where atmospheric pressure prevails for example, through a three way valve similar to that which was described with reference to FIGS. 1 and 2, disposed in a recess in the piston 90, and actuated by a plunger 128 solid with the control rod 130 and symmetrical relative to the axis Y–Y' of the control module 100.

As for the first embodiment of the invention, a first valve passage comprises a seal 148 cooperating with the cylindrical surface 134 of the plunger 128 and the second valve passage comprises a seal 146 cooperating with the same surface 134.

A support structure 138 identical to the structure 38 described above has the same function of guiding the plunger 128 and of receiving the seals 146 and 148 and therefore will not be described in more detail.

The piston 90 is also formed with axial passages 158, spaced regularly apart around the axis Y–Y', and bringing the second volume 114 of the control module 100 into communication with the volume 160 around the plunger 128, and an abutment member 162 is mounted in the piston 90 to limit the axial stroke of the plunger 128 relative to the piston 90 and define its rear rest position relative to the piston.

As shown in FIG. 3, the control module 100 is designed to control remotely a booster 300, shown schematically, formed from an envelope divided internally by a sealed movable partition into a front chamber connected permanently to the second volume 114 through the duct 115, and a rear chamber connected permanently to the first volume 116 through a duct 117.

A pressure generator such as a single master cylinder 400 is fixed on the front wall of the booster 300 and is actuated by this booster. The outlet of this pressure generator 400 is connected through a hydraulic duct 119 to an annular boost chamber 92 formed in the body 86 of the control module 100 between the shoulders of the stepped bore 88 and of the stepped piston 90.

In this design, when the driver of the vehicle actuates the brake pedal, the control rod 130 is displaced forwards. The plunger 128 then controls the functioning of the three way valve as has been described above in order that the valve first isolates the volumes 114 and 116 from each other, then puts the first volume 116 into communication with the annular space 132. The result is an increase in pressure in the volume 116, transmitted through the duct 117 to the rear chamber of the booster 300, whose front chamber is connected permanently to the source of vacuum.

This pressure difference is exerted across the two faces of the movable partition of the booster 300 and tends to move it forwards, so that it displaces the piston of the pressure generator 400 and causes an increase in pressure in the duct 119, which is transmitted to the annular boost chamber 92.

The pressure in the annular chamber 92 is exerted on the shoulder of the piston 90 and tends to move it forwards. The piston 90 comprises an annular face surrounding the front face of the plunger 128, these two faces bearing against a reaction disc 166 solid with a thrust rod 164. The reaction disc 166 therefore receives simultaneously the input force transmitted by the plunger 128 and the boost force transmitted by the piston 90 on which is applied the pressure within the chamber 92. The reaction disc 166 and the thrust rod 164 transmit the addition of these two forces to the piston 94 of a master cylinder 200, which then generates a pressure increase in the brake actuators (not shown) producing the boosted brake action required by the driver of the vehicle.

As in the previous embodiment, the axial passages and the radial openings formed in the support structure 138, and the radial passages formed in the piston 90 are aligned in the axial direction and extend over circular arcs subtending the same angle at the centre, so as to give them relatively large angular sizes, these different elements being subjected only to relatively small forces, and therefore not needing to have a very high mechanical strength.

Similarly, the two valve passages, between the atmosphere and the rear volume 116 on one hand, and between the rear volume 116 and the front volume 114 on the other hand, are disposed in different transverse planes, and their diameters are independent of each other. They can therefore be given predetermined dimensions, resulting in a predetermined cross sectional area for the air passage.

The pressure can accordingly increase relatively rapidly in the rear volume 116 of the control module 100, and therefore in the rear chamber of the booster 300, and create a pressure difference across the mobile partition resulting in a rapid increase in the hydraulic pressure in the boost chamber 92 to move the piston 90 forwards.

The noise of operation of the control module is also reduced in considerable proportions. As seen above, the particular design of the three way valve forming the valve means in accordance with the invention enables the different openings for passage of air to be provided in equal numbers, regularly spaced about the axis Y–Y', in such a way that their centres are in the same plane, as seen in FIG. 4. Accordingly, the masses of air set in motion during the operation of the control module fitted with the valve of the present invention will have a velocity whose components are contained only in one plane, for example that of FIG. 4.

In other words, the flow of air in the control module is perfectly symmetrical about the axis Y–Y', in all cases of operation, that is to say that all turbulence is eliminated as well as the noise which results from it.

It is to be understood that the invention is not limited to the embodiments which have been described but on the contrary is capable of receiving many modifications which will be apparent to a person skilled in the art. In particular, for example, the embodiment of the invention illustrated in FIGS. 1 and 2 is of course applicable in the same way to boosters of the tandem kind or to add on chambers.

I claim:

1. A pneumatic booster for braking assistance, comprising:

an envelope presenting an axis of symmetry;

at least one movable partition structure for sealingly separating said envelope into at least a first chamber connected permanently to a first source of fluid having a low pressure and at least a second chamber connected selectively to said first chamber or to a second source of fluid having a high pressure;

a three way valve means having a plunger sliding in a bore of a piston and solid with a control rod, said plunger being positioned in said bore to communicate said first source of fluid between said first chamber and said second chamber or communication said second source of fluid between the second chamber and said second source of high pressure; and support structure disposed in said piston, said support structure comprising two annular seals which cooperate with a cylindrical surface of said plunger and a median part for guiding sliding of the plunger, each said annular seal having an angled edge with a vertex in a rest condition which is disposed at a distance from said axis of symmetry which is slightly less than a radius of said cylindrical surface of said plunger.

2. The pneumatic booster according to claim 1, characterised in that said angled edges of said seals are disposed in parallel planes which are spaced apart axially by a distance which is slightly less than an axial length of said cylindrical surface of said plunger.

3. The pneumatic booster according to claim 2, characterised in that said cylindrical surface of said plunger has truncated conical surfaces on a front end and a rear end.

4. The pneumatic booster according to claim 3, characterised in that said median part of said support structure has openings which communicate with said second chamber via radial passages formed in said piston.

5. The pneumatic booster according to claim 4, characterised in that said piston has axial passages which open into said bore in which said plunger slides, said axial passages communicate with said first chamber of said booster, said axial passages being aligned with said radial passages for communicating with said second chamber of said booster.

6. The pneumatic booster according to claim 1, characterised in that said piston being part of said movable partition structure of the booster.

7. The pneumatic booster according to claims 1, characterised in that said piston being part of a control module which controls the booster remotely.

8. The pneumatic booster according to claim 7, characterised in that said control module comprises a stepped piston which divides a bore into a first volume connected permanently to said second chamber of the booster through a first duct and a second volume connected permanently to said first chamber of the booster through a second duct, and an annular assistance chamber connected through a third duct to an output of a pressure generator actuated by the booster.

* * * * *